No. 710,011. Patented Sept. 30, 1902.
W. B. ROHMER.
COMBINED FERTILIZER DISTRIBUTER AND SEED PLANTER.
(Application filed June 19, 1901.)
(No Model.) 2 Sheets—Sheet 1.
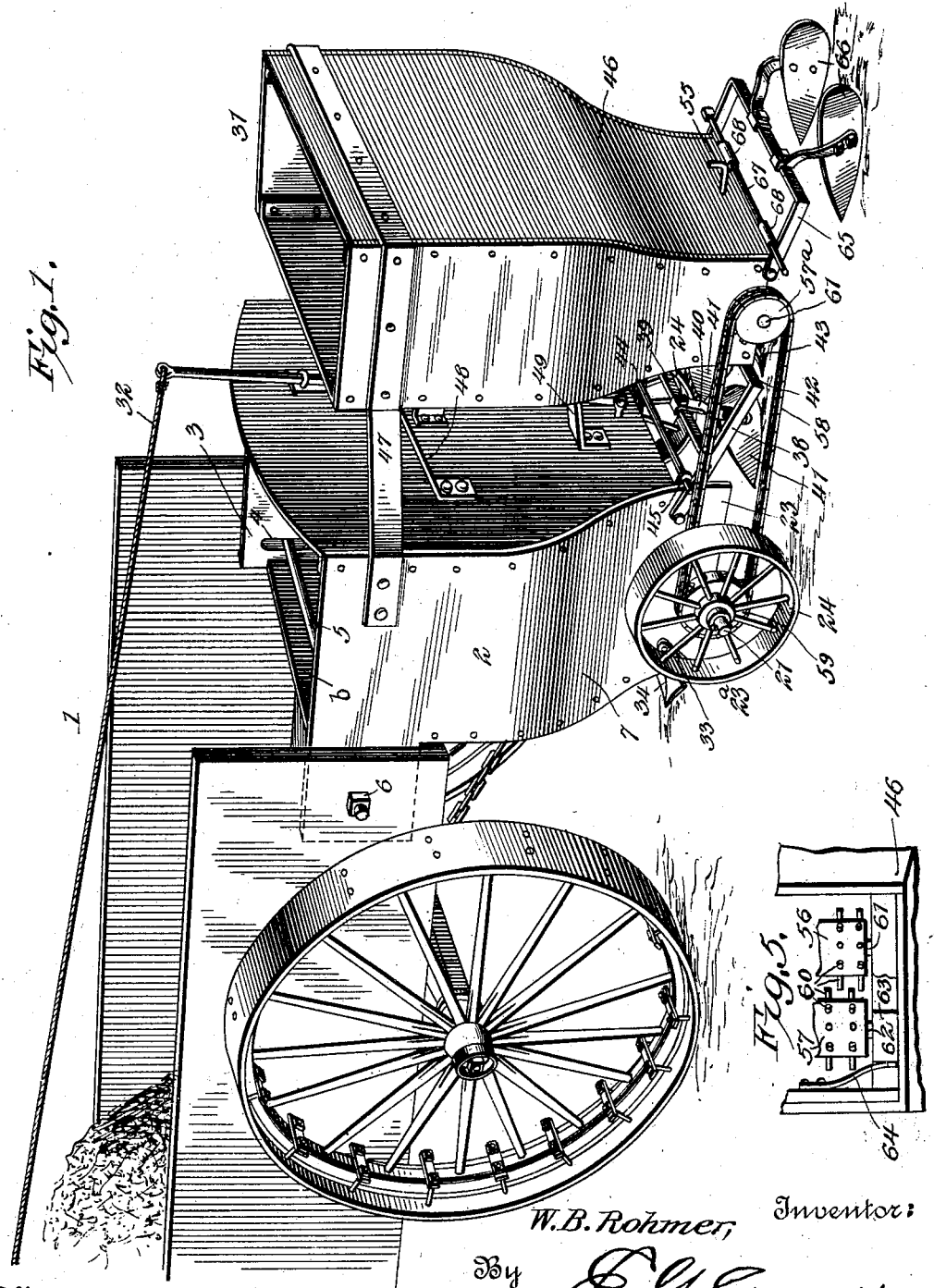
Witnesses:
Howard D. Orr.
R. M. Elliott.
Inventor:
W. B. Rohmer,
By E. G. Siggers
Attorney.

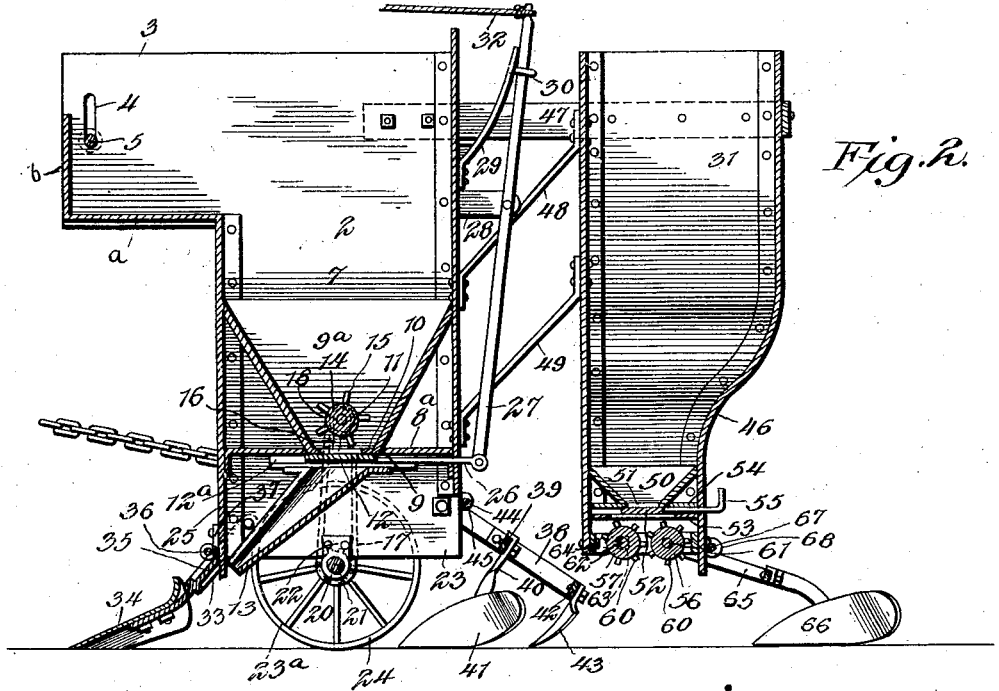

UNITED STATES PATENT OFFICE.

WILLIAM B. ROHMER, OF BAY ST. LOUIS, MISSISSIPPI.

COMBINED FERTILIZER-DISTRIBUTER AND SEED-PLANTER.

SPECIFICATION forming part of Letters Patent No. 710,011, dated September 30, 1902.

Application filed June 19, 1901. Serial No. 65,170. (No model.)

*To all whom it may concern:*

Be it known that I, WILLIAM B. ROHMER, a citizen of the United States, residing at Bay St. Louis, in the county of Hancock and State of Mississippi, have invented a new and useful Combined Fertilizer-Distributer and Seed-Planter, of which the following is a specification.

This invention relates to combined fertilizer-distributers and seed-planters.

The object is to provide an improved apparatus of the above description that will, in a simple, thoroughly efficient, and at once practical manner, open a furrow, deposit fertilizer therein, cover in the fertilizer, mark the ridge without disturbing the fertilizer, deposit the seed, and then cover them, all of the parts being combined and operating in sequence, the mechanism employed for the purpose named being so disposed that there will be an assured positiveness of operation and but small liability of derangement or destruction in use.

A further object is to provide simple means by which the shovels and coverers may be thrown out of use in changing from one furrow to another.

A further object is to provide improved means by which the apparatus may be associated with a wagon or vehicle to carry a supplemental supply of fertilizer.

A further object is to provide simple means by which when the apparatus is associated with a wagon requisite play between the apparatus and the wagon may be permitted to compensate for inequalities in the ground over which the apparatus is being drawn.

With these and other objects in view, as will appear in the presentation of the case, the invention consists in the novel construction and combination of parts with a combined fertilizer and seed-planter, as will be hereinafter fully described and claimed.

In the accompanying drawings, forming a part of this specification, and in which like characters of reference indicate corresponding parts, I have illustrated a form of embodiment of my invention capable of carrying my ideas into effect, it being understood that the parts of the apparatus herein described may be changed as to construction and disposition with relation to each other without departing from the spirit of the invention, and in these drawings—

Figure 1 is a view in rear perspective showing the apparatus as attached to an ordinary farm-wagon. Fig. 2 is a view in longitudinal section. Fig. 3 is a view in bottom plan. Fig. 4 is a detail perspective view of the shovel or opener and its supporting-yoke. Fig. 5 is an enlarged detail view, in inverted plan, showing one of the springs for actuating one of the seed-feed rollers.

Referring to the drawings, 1 designates a portion of an ordinary farm-wagon to which the apparatus is attached in use. In order to prevent the wheels of the wagon from sinking into the ground where the same is soft, boggy, or muddy, the rims of the wheel are to be made of considerable width—say from four to five inches—these rims to be supplemental to the rims proper and secured thereto in any suitable manner. The object for having the apparatus attached to a wagon is that a supply of fertilizer may be carried along with the apparatus in a quantity sufficient to supply the requisite amount of fertilizer to be used over a given area of ground, thereby rendering unnecessary that the farmer should frequently return to the barn to replenish the supply of fertilizer.

While the apparatus is shown and described as associated with a wagon in use, it is to be understood that it may be provided with supporting means of its own and be drawn over the ground in the usual manner, thereby dispensing with the employment of the wagon; but for the reasons pointed out it will be of obvious advantage to associate it with a wagon. The part of the apparatus connected with the wagon constitutes the fertilizer-box 2, this being provided at its upper portion with a forward-extending member or offset 3 to rest on the body of the wagon, the member being provided on each side with a vertical slot 4, through which passes a rod 5, the rod to pass through openings provided in the side of the wagon-body for the purpose and to be held assembled with relation to the fertilizer-box and the wagon-body by means of a nut 6 carried by the rod. The object of providing the vertical slots is to allow the fertilizer-box to have a range of movement independent of the wagon-body, thereby to compensate for inequalities in the ground.

As best illustrated in Fig. 2, it will be seen that the forward extension 3 has a flat bottom $a$ to rest flat upon the upper side of the bottom of the vehicle, with its upstanding sides fitting snugly within the inner faces of the respective sides of the wagon. The front end of the extension is partly closed by means of an upstanding end portion $b$, which preferably terminates short of the top of the extension and also takes the place of the usual end-gate, so as to prevent the fertilizer from being fed into the fertilizer-box by the jolting movement of the wagon, as such a continuous feeding of the fertilizer would soon choke and overflow the box 2. It will be understood that the fertilizer is supplied to the box in suitable quantities by the driver of the wagon or other attendant, who shovels the fertilizer from the wagon into the box whenever it becomes necessary.

The fertilizer-box 2 is by preference constructed of sheet-iron or galvanized iron and is in side elevation preferably rectangular and in end elevation approximately hopper-shaped, with curved sides 7, converging into a comparatively narrow throat 8, closed by a plate $8^a$ having an opening 9 therein. The form of fertilizer-box herein shown is one that will be generally preferred; but it is understood that I do not desire to limit my invention to this precise contour, as other designs may be employed and still be within the scope of my invention. Within the box 2 is the feed-hopper $9^a$, the same having inclined sides and ends, terminating with a bottom 10, having an opening 11, the bottom 10 resting over or fitting in the opening 9. Beneath the opening 11 in the hopper is arranged a cut-off or slide 12, the slide being movable in guides $12^a$, secured to the under side of the plate $8^a$, the slide to control the escape of fertilizer from the box, and beneath and in alinement with the hopper $9^a$ is a chute or spout 13, projecting to the front of the box and serving to convey the fertilizer from the box to the furrow. Arranged in the bottom of the hopper 9 is a roller 14, provided with a plurality of arms or projections 15, which operate to stir up the fertilizer, and thus prevent any clogging, the roller being supported by bearings 16, suitably secured within the hopper. This roller is driven from a sprocket-chain 17, which engages a sprocket-wheel 18 at one end of the roller, the chain passing around and receiving motion from a sprocket-wheel 20, mounted on the supporting-axle 21 of the apparatus. The axle 21 is journaled in bearings 22, secured to the lower depending sides 23 of the feed-box 2, and carries wheels $23^a$, which, for the purpose of preventing their sinking into the ground when the same is soft or muddy, are provided with wide treads or rims 24, which may constitute the tires proper or may be detachably secured thereto in the same manner as the rims shown on the wheels of the wagon.

It will be observed that the discharge from the spout 13 is directed downward by the front depending wall 25 of the fertilizer-box 2, so that any waste of the fertilizer or its distribution at points not desired will be obviated. The slide 12 carries a rod 26, to which is connected one end of a lever 27, the latter being supported on the back of the fertilizer-box by arms 28, the slide normally held closed or in the position to prevent the escape of fertilizer from the fertilizer-box by a spring 29, secured at one end to the back of the fertilizer-box and at the other end bearing upon the rod 27, the spring carrying a collar 30, by which it may be held in proper relation with the rod. The spring 29 herein shown is an ordinary leaf-spring and will be found to perform the functions designed; but it is to be understood that in lieu of the leaf-spring an ordinary coil-spring may be employed, in which event one end would be secured to the rod and the other end to the rear wall of the seed-box 31.

Connecting with the rod 27 is a wire or cord 32, which passes forward to the driver of the wagon, so that the slide may be opened at will and by the provision of a suitable cleat may be held at the desired adjustment to permit of the escape of the proper amount of fertilizer.

Pivotally connected with the fertilizer-box at its front side and near the bottom thereof is a yoke 33, carrying a shovel or opener 34, the shank 35 of which is preferably of resilient material and suitably attached to the front of the fertilizer-box. The shovel may be of any preferred form, such as in common use to open a furrow, and may be associated with a shank in any preferred manner. The yoke 33 is here shown as pivoted to the sides of the bottom portion of the fertilizer-box 2; but it may be otherwise associated with the box, the point being to permit the yoke to move through an arc sufficient to bring it into engagement with the ground or to lift it clear of the ground. In order to hold the yoke downward in operative position to open a furrow, a locking-rod 36 is employed, this being passed through eyes or keepers 37, secured upon the front of the fertilizer-box 2, at each side thereof. When the locking-rod bears on the upper surfaces of the arms of the yoke, the shovel will be held into engagement with the ground, and by removing the rod, lifting the yoke, and then passing the rod through the keepers beneath the yoke the shovel will be let out of contact with the ground. Pivotally connected with the rear portion of the fertilizer-box, near its bottom, as at $c$, is a yoke 38, preferably rectangular in shape and carrying a cross-bar 39, to which is secured the shanks 40 of two coverers 41, these being disposed at such angle with relation to the shovel 34 as to effect a covering up or listing over of the soil divided by the shovel. On the rear arm 42 of the yoke 38 and having its point disposed between the coverers 41 is a marker 43, the function of which is to mark a groove in the furrow for the reception of the seed, the mark thus made not being of sufficient depth to throw out any of the fertilizer. The connection between the coverers 41 and their shanks 40 may be of any preferred style, and therefore these parts need no specific description. The association between the shanks 40 with the yoke and of the marker with the yoke is to be a rigid one, thereby to secure an effective operation in use. The object of having the yoke 38 pivotally connected with the fertilizer-box is to permit of its being raised or lowered to bring the coverers and marker into engagement with the ground or to hold them out of engagement with the ground for the same reason as stated in connection with the shovel 34, and for this purpose a bar 44 is provided to engage eyes or keepers 45, secured to the fertilizer-box. When this bar bears upon the top of the yoke 38, the coverers and marker will be held in proper operative relation with the ground. By removing the bar, lifting the yoke, and then inserting the bar in the eyes or keepers under the yoke the coverers and marker will be held out of contact with the ground.

The seedbox 31, to which reference has been made, is by preference of the same shape in end elevation as the fertilizer-box; but in side elevation instead of being rectangular the back is curved downward and inward, as shown at 46, thereby, in conjunction with the curved sides, to constitute the mouth. The seedbox is held associated with the fertilizer-box by side braces 47 and end braces 48 and 49, the latter being secured to the opposed faces of the two boxes, as clearly shown in Fig. 2. In the bottom of the seedbox is secured a hopper 50, having an opening 51, beneath which is arranged a slide 52, working in guides 53, secured to the bottom 54 of the seedbox, the slide being operable from without through a stem or shank 55, projecting rearward from the seedbox. Arranged below the discharge-opening are two rollers 56 and 57, the shaft of the roller 56 projecting outward beyond the side of the seedbox and carrying a sprocket-wheel 57$^a$, around which passes a sprocket-chain 58 to and around a sprocket-wheel 59, carried by the supporting-shaft 21 of the fertilizer-box. Each of the rollers 56 and 57 is provided with a plurality of spikes or arms 60, by which certain feed of the seed is effected. The shaft 61 of the roller 56 is mounted merely for rotary movement, while the shaft 62 of the roller 57 is adapted for both rotary and longitudinal movement, thereby to permit the said roller to yield with relation to the first-named roller in the operation of the machine. To effect this yielding action, the journal-bearing 63 on each end of the shaft is spring-pressed, as shown in 64, (see Fig. 5,) the springs operating to hold the roller in proper operative position with relation to the roller 56; but the stress of the springs is not to be such as to cause such contact between the rollers as would tend to bruise or injure the grain. Pivoted to the rear portion of the seedbox, as at $d$, is a yoke 65, carrying two coverers 66, these being disposed at such angle with relation to the hill as to cause the soil divided by the marker 43 to be covered in over the seed as dropped. This yoke has also associated with it a locking-bar 67, adapted to be housed in keepers 68, so that by placing the bar above the yoke the coverers will be rigidly held in contact with the ground, and by placing the bar beneath the yoke the coverers will be held above the ground.

The arrangement and combination of parts either as shown or as modified will be effective for performing the functions designed, and for this reason it is to be understood that I do not limit the invention to the exact arrangement of the parts shown, any other arrangement operating substantially in the same manner and producing the same results being within the scope of my invention.

The operation of the apparatus is as follows: The fertilizer-box being secured to the body of the wagon in the manner described is supplied with fertilizer and the seedbox with seed, the cut-off slide on both parts being closed. The shovel and the coverers are raised in the manner described and the apparatus drawn over the field. When the operation is to be begun, the shovels and coverers are locked in their lowered position and the team is started. Prior to starting, however, the operator will adjust the slide of the seedbox to permit the requisite amount of seed to be dropped. As soon as a team is started the cut-off of the fertilizer-box is opened to the desired extent and is held in such adjusted position in the manner described. As the wagon advances the shovel 34 will open a furrow, and into this furrow the fertilizer will be dropped through the chute 13. The coverers will then throw the soil over the fertilizer, and then the marker 43 will cut a shallow groove through the crest of the hill, and the seed from the seedbox will be dropped in this groove, after which the coverers 41 cover the soil in over the seed. When the end of a furrow has been reached and the apparatus is to be turned to start another furrow, the shovel and coverers may be lifted or not, as may be preferred.

By reason of the ease with which the slides of the fertilizer-box and the seedbox may be adjusted it will be obvious that the apparatus may be operated without waste of these materials.

The manner of driving the cylinder in the fertilizer-box herein shown is merely illustrative of one way in which this may be effected, as it will be obvious that instead of the chain a belt being on the inside of the fertilizer-box the shaft of the cylinder may be extended through the walls of the hopper and may be operated in an obvious manner from without the hopper.

It is to be understood that I do not limit the successful operation of the device to its attachment to a wagon for conveying a supplemental load of fertilizer, as it will be obvious that by taking an ordinary axle having two wheels connecting therewith, suitable clips for supporting a bottom, sides, and end, and associating this structure with the fertilizer-distributer in the same or somewhat-different manner from that shown and have this supplemental structure to constitute a conveyer for the additional load of fertilizer that the same results can be attained as set forth when a wagon is employed in connection with the apparatus. This structure may be readily constructed by an ordinary farmer and be attached to the fertilizer-distributer and seed-planter with readiness and ease.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

What I claim is—

1. In a device of the character described, the combination of a wheel-supported fertilizer-box having an upper forwardly-directed extension constructed to register with the rear end of a vehicle, and provided with means for loose connection with the vehicle, a seed-box located in rear of the fertilizer-box, brace connections between the two boxes, a cut-off for the fertilizer-box, a lever connected to the cut-off and mounted between the two boxes, and controlling means connected to the lever and projected forwardly to be under the control of the driver of the vehicle.

2. A device of the character described, embodying a front fertilizer-box, a seedbox located in rear of the fertilizer-box, brace connections between the two boxes, the fertilizer-box being provided with a forwardly-directed extension to register with the rear end of a vehicle and having means for loose connection therewith, a cut-off for the fertilizer-box, cut-off-operating means mounted between the two boxes, and a controlling device connected to said operating means and extended to be under the control of the driver of the vehicle.

3. The combination with a vehicle to contain fertilizer, of a fertilizer-distributer comprising a box having its front portion provided with vertical slots, and a bolt piercing the sides of the vehicle and passing through the slots to loosely connect the box to the vehicle.

4. A fertilizer-distributer having its fertilizer-box provided with a forwardly-extending member having its side walls provided with vertical slots, in combination with a vehicle having its side-boards each provided with an opening, and a bolt-rod passing through the openings in the side-boards and the slots in the fertilizer-box to hold the parts assembled.

5. A fertilizer-distributer having its fertilizer-box provided with a forwardly-extending member having its side walls provided with vertical slots, in combination with a vehicle having its side-boards each provided with an opening, a bolt-rod passing through the openings in the side-boards and the slots in the fertilizer-box to hold the parts assembled, and flexible means connecting the fertilizer-box with the vehicle.

6. The combination of a front-wheeled fertilizer-box, having a forwardly-directed extension to register with the rear end of a vehicle and having means for connection therewith, a seedbox located in rear of the fertilizer-box, brace connections between the two boxes, whereby the rear box is supported upon the front box, feed mechanism for the fertilizer-box in operative relation to the wheels thereof, a cut-off for the fertilizer-box, a controlling-lever mounted between the boxes and connected to the cut-off, a discharge-spout for the fertilizer-box, an opener carried by the front of the fertilizer-box and immediately in front of the spout, coverers carried by the rear of the fertilizer-box, feed mechanism for the seedbox in operative relation to the wheels of the fertilizer-box, and coverers carried by the rear of the seedbox.

7. In a device of the class described, the combination with a box or hopper, of a yoke pivoted to the front of the box, a furrow-opener carried by the yoke, and means carried by the front of the box for holding the shovel in engagement and out of engagement with the ground.

8. In a device of the class described, the combination with a box or hopper, of a yoke pivoted to the front of the box, an opener carried by the yoke, a keeper carried by the front of the box, and a rod detachably held within the keeper and projected at opposite ends across the yoke, the latter being capable of a vertical swing to positions above and below the rod, whereby the latter forms a stop to hold the opener in engagement and also out of engagement with the ground.

9. In a device of the character described, the combination with a wheeled box, of front and rear yokes pivoted to the fertilizer-box, coverers carried by the rear yoke, an opener carried by the front yoke, keepers upon the front and rear of the box, and rods detachably held within the respective keepers and projected at opposite ends beyond the respective yokes, the latter being capable of vertical movement to positions above and below the adjacent bars, whereby the said bars are adapted for holding the opener and coverers in engagement and also out of engagement with the ground.

10. In a device of the character described, the combination with a box or receptacle having its lower end provided with a contracted discharge-opening, of a pair of toothed feed and agitating rollers mounted beneath the discharge-opening, one of said rollers being yieldable toward and away from the other roller, and a cut-off located between the rollers and the discharge-opening.

11. In a device of the character described, the combination with a box or receptacle having a contracted discharge-opening in its lower end, of a pair of toothed feed and agitator rollers mounted beneath the discharge-opening, one of the rollers being relatively fixed, and the other roller having slidable bearings which are movable toward and away from the relatively fixed roller, springs bearing against the slidable bearings to yieldingly force the movable roller toward the fixed roller, and a cut-off located between the rollers and the discharge-opening.

12. A fertilizer-distributer comprising a box or hopper having feed mechanism, and provided at its upper end with an offset forwardly-directed body extension constructed to fit within the rear end of a wagon-body and rest upon the bottom thereof after the end-gate has been removed, and carrying means for connection with the wagon-body.

13. A fertilizer-distributer, comprising a box or hopper having feed mechanism, and provided at its upper end with an offset forwardly-directed body extension provided with a closed front end, said extension being constructed to fit within the rear end of a wagon and rest upon the bottom thereof after the end-gate has been removed and carrying means for connection with the wagon to prevent separation therefrom, the front end of the extension forming an obstruction to prevent fertilizer being jolted from the wagon into the box or hopper.

14. A fertilizer-distributer, comprising a box or receptacle having feed mechanism, the upper front portion of the box being provided with an opening, a flat bottom projected forwardly from the lower edge of the opening, opposite upstanding sides rising from the bottom, an outer end also rising from the bottom, said bottom, opposite sides and front end forming a forward extension of the box to fit within the rear end of a vehicle, and means carried by the extension for connecting the same to a vehicle.

In testimony that I claim the foregoing as my own I have hereto affixed my signature in the presence of two witnesses.

W. B. ROHMER.

Witnesses:
RENÉ DE MONTLUZIN,
EDGAR D. PRUDEAUX.